United States Patent [19]

O'Brien

[11] Patent Number: 4,743,748

[45] Date of Patent: May 10, 1988

[54] THREE-DIMENSIONAL DISPLAY SYSTEM WITH A FEEDBACK CONTROL LOOP SENSITIVE TO THE INSTANTANEOUS POSITIONING OF A FLEXIBLE MIRROR MEMBRANE

[76] Inventor: Thomas P. O'Brien, 682 Deerpath Dr., Deerfield, Ill. 60015

[21] Appl. No.: 764,116

[22] Filed: Aug. 9, 1985

[51] Int. Cl.⁴ .............................................. G01J 1/20
[52] U.S. Cl. .................................... 250/201; 340/755
[58] Field of Search ...................... 250/201, 204, 215; 358/88, 89; 340/755, 724; 350/419, 144

[56] References Cited

U.S. PATENT DOCUMENTS

| | | | |
|---|---|---|---|
| 3,031,928 | 5/1962 | Kopito | 350/419 |
| 3,493,290 | 2/1970 | Traub | 350/174 |
| 3,496,851 | 2/1970 | Himmelsbach | 350/419 |
| 4,091,274 | 5/1978 | Angelbeck et al. | 250/201 |
| 4,271,355 | 6/1981 | Wisner et al. | 250/201 |
| 4,462,044 | 7/1984 | Thomason et al. | 340/755 |

OTHER PUBLICATIONS

"A New 3-Dimensional Display Technique" by Alan C. Traub, May, 1968.

Primary Examiner—David C. Nelms

[57] ABSTRACT

A system for accurately controlling the motion of a mirror membrane used in a three-dimensional display system. The system senses the pressure differential across the membrane mirror as a means of indirectly measuring mirror position. This pressure differential is converted into an electrical signal which is used in a closed loop feedback system to force the membrane position to follow accurately the command signal.

4 Claims, 1 Drawing Sheet

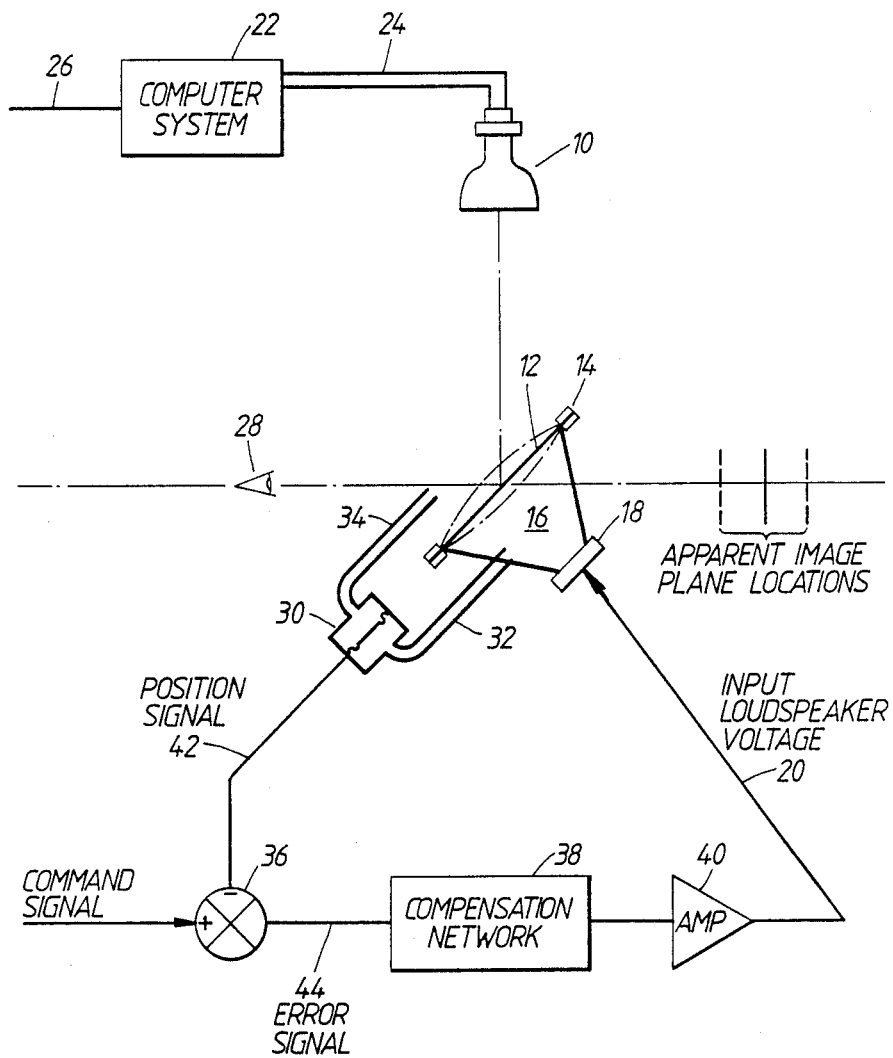

THREE-DIMENSIONAL DISPLAY SYSTEM WITH A FEEDBACK CONTROL LOOP SENSITIVE TO THE INSTANTANEOUS POSITIONING OF A FLEXIBLE MIRROR MEMBRANE

BACKGROUND OF THE INVENTION

I. Field of the Invention

The present invention relates to a three-dimensional display system which includes a volumetric display mechanism having a flexible mirror membrane from which images may be reflected in a manner which produces an illusion of a three-dimensional display.

II. Background of the Invention

Volumetric three-dimensional display systems are known. For example, one such system is disclosed in U.S. Pat. No. 3,493,290 issued to Traub. The system disclosed in the Traub patent includes a volumetric display member having a flexible mirror membrane.

In order to create a three-dimensional display employing such a flexible mirror membrane, a sequence of images must be reflected from the surface of that membrane in synchronism with the precise positioning of the membrane. The sequence of images may be produced by a computer system and positioning of the mirror may be controlled by driving a conventional loudspeaker to which the mirror membrane is attached with a standard sinusoidal signal. However, it is critical that the mirror membrane be positioned in precise synchronization with the projection of images onto that membrane.

SUMMARY OF THE INVENTION

It is, accordingly, an object of the subject invention to provide a three-dimensional display system which accurately controls the positioninq of a flexible mirror membrane employed in a volumetric display mechanism of that system.

Additional objects and advantages of the invention will be set forth in the description which follows and in part will be obvious from the description or may be learned by practice of the invention.

To achieve the foregoing object and in accordance with the purposes of the invention as embodied and broadly described herein, a three-dimensional display system is provided which comprises: (a) volumetric display mechanism including a flexible mirror membrane from which imaqes may be reflected and means for positioning that membrane in response to an input signal; (b) control means for generating a command signal indicative of the desired positioning of the membrane; (c) sensing means for detecting the actual positioning of the membrane and for generating a position signal indicative of that actual positioning of the membrane; and (d) feedback means responsive to the command signal and the position signal for generating an error signal indicative of the difference between the desired positioning of the membrane and the actual positioning of the membrane and for applying that error signal to the volumetric display mechanism as the input signal for that mechanism. Preferably the feedback means includes means for subtracting the position signal from the command signal to provide the error signal.

It is also preferable that the volumetric display mechanism include a loudspeaker assembly covered by the flexible mirror membrane to form an enclosed volume behind the membrane, and that the sensing mechanism include means for detecting pressure differential between the inside and the outside of the enclosed volume.

The volumetric display system of the subject invention may also be viewed as comprising a volumetric display mechanism including a loudspeaker assembly covered by a flexible mirror membrane from which images may be reflected, the membrane and the loudspeaker assemble forming an enclosed volume; pressure differential means for detecting pressure differential between inside and outside the enclosed volume; and means, responsive to that pressure differential means, for controlling the positioning of the membrane.

BRIEF DESCRIPTION OF THE DRAWING

The attached FIGURE is a schematic block diagram of one embodiment of a three-dimensional display system incorporating the teachings of the present invention.

DESCRIPTION OF THE PREFERRED EMBODIMENT

In the drawing there is illustrated, among other things, the basic components of a conventional volumetric display mechanism for a three-dimensional display system. These conventional components include a CRT display monitor 10, a flexible mirror membrane 12 mounted to cover a loudspeaker assembly 14 to form an enclosed volume 16 behind membrane 12. Loudspeaker assembly 14 includes a solenoid 18 which operates, as is well known to those skilled in the art, to position membrane 12 in response to an input control signal in the form of an input loudspeaker voltage. This input loudspeaker voltage is provided to the input of solenoid 18 over conductor 20.

The conventional illustrated components also include a computer system 22 which, as is well known to those skilled in the art, provides a sequence of two-dimensional images over conductor 24 to the input of CRT display monitor 10 and which provides a command signal over line 26 which typically is employed as the input loudspeaker voltage on conductor 20. The command signal on line 26 may, for example, comprise a sinusoidal signal designed to operate solenoid 18 in a manner whereby a mirror membrane 12 is alternately made convex and concave by pressure changes induced by solenoid 18 in enclosure 16.

The above-described arrangement causes an apparent image plane of mirror 12 to alternately approach and recede from a viewer 28, giving a true sense of depth to the image from CRT display monitor 10 reflected from mirror 12. The principle behind this three-dimensional display technique is disclosed in the above-mentioned Traub patent, the contents of which is hereby expressly incorporated herein.

In summary, a volumetric display mechanism is illustrated which includes a flexible mirror membrane 12 from which images may be reflected and which further includes loudspeaker assembly 14 with solenoid 18 for positioning membrane 12 in response to an input signal over conductor 20. In addition, computer system 22 generates a command signal over conductor 26 indicative of the desired positioning of membrane 12.

In accordance with the present invention, sensing means is provided for detecting the actual positioning of the membrane and for generating a position signal indicative of that actual positioning. In addition, feedback means is provided responsive to the command signal and the position signal, for generating an error signal indicative of the difference between the desired positioning of the membrane and the actual positioning of the membrane and for applying an error signal to the volumetric display mechanism as the input signal to that mechanism.

As is shown in the attached FIGURE by way of example but not limitation, a differential pressure transducer and amplifier 30 is provided which measures the pressure difference between the front and rear surfaces of membrane 12. Since the motion of membrane 12 is directly proportional to this pressure differential, measurement of this differential provides an excellent variable for indirectly measuring membrane 12 motion. A suitably sensitive and accurate differential pressure transducer with internal processing and amplifying electronics is readily commercially available. For example, differential pressure transducer model No. 239 manufactured by Setra Systems, Inc. of Acton, Mass. may be employed. In this regard, transducer 30, as illustrated, has one pressure input mechanism 32 which is coupled to enclosure 16 behind membrane 12 and a second pressure input mechanism 34 which is located outside enclosure 16 to measure the differential between the front and rear surfaces of membrane 12.

As is further illustrated in the attached FIGURE, the system disclosed therein also includes a summation unit 36, a compensation network 38, and an amplifier 40. A positive input of summation unit 36 is coupled to receive the command signal from computer system 22 over conductor 26 which indicates the desired positioning of membrane 12. A negative input of summation unit 36 is coupled to receive the output of transducer 30 over conductor 42. This output indicates the actual positioning of membrane 12. Summation unit 36, accordingly, operates to provide the difference between the command signal on conductor 26 and the position signal on conductor 42 to form an error signal on conductor 44 which is provided to the input of compensation network 38. Preferably, summation unit 36 may comprise a differential amplifier which is capable of providing a voltage proportional to the difference between the desired mirror position (command signal) and the actual mirror position (position signal).

As in most classical closed loop feedback control systems, a compensation network is required to assure that the feedback control will be stable and have a linear response for a large frequency range. The compensation network 38 is, accordingly, provided to prevent oscillation. As is well known to those skilled in the art, compensation network 38 compensates for phase shifts through utilization of, for example, lead-lag compensation techniques.

The output of compensation network 38 is provided to amplifier 40 wherein the error signal from summation unit 36 is amplified to produce a resultant input loudspeaker voltage with sufficient power to actually drive solenoid 18 of loudspeaker assembly 14.

The advantage of using a closed loop control system of the type described above is that the position of membrane 12 as a function of time is fully predictable. This means that the timing of displaying successive images on CRT display monitor 10 can be based upon a known position of membrane 12, in contradistinction to known prior art systems without a closed loop control system, wherein the membrane position is not accurately predictable and must be experimentally determined for each assembly.

In addition, the control signal of the subject invention allows membrane 12 to follow a wide variety of command signals with high fidelity. This factor is believed to have advantages in reducing the data rates of the system and possibly improving the brightness of the resultant display.

Additional advantages and modifications will readily occur to those skilled in the art. The invention in its broadest aspects is, therefore, not limited to the specific details, representative apparatus and illustrative examples shown and described. Accordingly, departures may be made from the disclosed details without departing from the spirit or scope of applicant's generic concept.

I claim:

1. A three-dimensional display system comprising:
   (a) a volumetric display mechanism including a flexible mirror membrane from which images may be reflected and means for positioning said membrane in response to an input signal;
   (b) control means for generating a command signal indicative of the desired positioning of said membrane;
   (c) sensing means for detecting the actual positioning of said membrane and for generating a position signal indicative of said actual positioning of said membrane; and
   (d) feedback means, responsive to said command signal and said position signal, for generating an error signal indicative of the difference between said desired positioning of said membrane and said actual positioning of said membrane and for applying said error signal to said volumetric display mechanism as said input signal.

2. A system of claim 1 wherein said feedback means include means for subtracting said position signal from said command signal to provide said error signal.

3. A system of claim 1 wherein said volumetric display mechanism includes a loudspeaker assembly covered by said membrane to form an enclosed volume behind said membrane and wherein said sensing means include means for detecting pressure differential between inside and outside said enclosed volume.

4. A three-dimensional display system comprising:
   (a) a volumetric display mechanism including a loudspeaker assembly covered by a flexible mirror membrane from which images may be reflected, said membrane and said loudspeaker assembly forming an enclosed volume; (b) pressure differential means for detecting pressure differential between inside and outside said enclosed volume; and
   (c) means, responsive to said pressure differential means, for controlling the positioning of said membrane.

* * * * *